(12) United States Patent
Hoel

(10) Patent No.: US 7,630,099 B1
(45) Date of Patent: Dec. 8, 2009

(54) REDUCING STORAGE REQUIREMENTS FOR DISPLAY DATA

(75) Inventor: Jeffrey H. Hoel, Palo Alto, CA (US)

(73) Assignee: Adobe Systems Incorporated, San Jose, CA (US)

(*) Notice: Subject to any disclaimer, the term of this patent is extended or adjusted under 35 U.S.C. 154(b) by 62 days.

(21) Appl. No.: 11/742,362

(22) Filed: Apr. 30, 2007

Related U.S. Application Data

(63) Continuation of application No. 10/738,918, filed on Dec. 16, 2003, now Pat. No. 7,212,313, which is a continuation of application No. 09/318,381, filed on May 25, 1999, now Pat. No. 6,741,368.

(51) Int. Cl.
*H04N 1/32* (2006.01)

(52) U.S. Cl. .................... 358/1.9; 358/426.01; 382/232; 382/239

(58) Field of Classification Search ................. 382/232, 382/233, 239, 244, 245; 358/470, 426.01, 358/426.13, 1.9
See application file for complete search history.

(56) References Cited

U.S. PATENT DOCUMENTS 4,876,607 A    10/1989   Tseng
5,710,719 A *  1/1998    Houle ........................ 382/232
6,741,368 B1   5/2004    Hoel

OTHER PUBLICATIONS

Nelson et al., "Sliding Window Compression", The Data Compression Book chapter 8, M&T Publishing, Inc., 1992, 215-253.
Data compression reference center, "dictionary methods, algorithms", 22 pgs., downloaded from www.rasip.fer.hr/research/compress.

* cited by examiner

*Primary Examiner*—Thomas D Lee
(74) *Attorney, Agent, or Firm*—Fish & Richardson P.C.

(57) ABSTRACT

A method and apparatus for generating a compressed representation of a two-dimensional image where the image is described as a sequence of pixels in raster order. The method includes receiving the two-dimensional image as a sequence of pixels in raster order. For each pixel, the system determines whether the pixel is part of a first string of pixels that is identical to a second string of pixels found previously in the image at one of a plurality of preselected fixed distances from the first string of pixels. If so, the first string of pixels is encoded as a string token that is a reference to the second string of pixels. Otherwise, the pixel is encoded as a non-string token.

32 Claims, 11 Drawing Sheets

Example of Pixel Literal Encoding

| Code | Distance Rank |
|---|---|
| 0 0 0 | 1 - 2 |
| 0 0 1 | 3 - 6 |
| 0 1 0 | 7 - 14 |
| 0 1 1 | 15 - 30 |
| 1 | 31 - 255 |

Fig. 5b

| Code | Meaning |
|---|---|
| 0 | String 1, Length 1 |
| 1 0 | String 1, Length 2-3 |
| 1 1 0 | String 1, Length 4-7 |
| 1 1 1 0 0 | String 1, Length 8-15 |
| 1 1 1 1 0 | String 2, Length 1 |
| 1 1 1 0 1 0 | String 1, Length 16-31 |
| 1 1 1 1 1 0 | String 2, Length 2-3 |
| 1 1 1 0 1 1 0 | String 1, Length 32-63 |
| 1 1 1 1 1 1 0 0 | String 2, Length 4-7 |
| 1 1 1 1 1 1 1 0 0 0 | Literal 1-2 |
| 1 1 1 1 1 1 1 0 0 1 | Literal 3-6 |
| 1 1 1 1 1 1 1 0 1 0 | Literal 7-14 |
| 1 1 1 1 1 1 1 0 1 1 | Literal 15-30 |
| 1 1 1 1 1 1 1 1 | Literal, other |
| 1 1 1 0 1 1 1 0 | String 1, Length 64-127 |
| 1 1 1 1 1 1 0 1 0 | String 2, Length 8-15 |

*Fig. 5c*

| 1 | 0 |   |   |   | Literal +/- 1-8

| 1 | 1 |   |   |   |   |   |   |   |   | Literal, Other

| 0 | 0 |   | String, Length 1 - 2

| 0 | 1 | 0 |   |   | String, Length 3 - 6

| 0 | 1 | 1 | 0 |   |   | String, Length 7 - 14

| 0 | 1 | 1 | 1 | 0 |   |   |   | String, Length 15 - 30

REDUCING STORAGE REQUIREMENTS FOR DISPLAY DATA

CROSS-REFERENCE TO RELATED APPLICATIONS

This application is a continuation application of, and claims priority to, pending U.S. patent application Ser. No. 10/738,918, entitled REDUCING STORAGE REQUIREMENTS FOR DISPLAY DATA, which was filed on Dec. 16, 2003, which is a continuation of U.S. patent application Ser. No. 09/318,381, entitled METHOD AND APPARATUS FOR REDUCING STORAGE REQUIREMENTS FOR DISPLAY DATA, which was filed on May 25, 1999, and now issued as U.S. Pat. No. 6,741,368. The disclosures of the above applications are incorporated herein by reference in their entirety.

BACKGROUND

The present invention relates generally to the storage of data in a device, and more particularly to a method and apparatus for reducing memory storage requirements in an output display device.

A computer system can output data to a wide variety of output display devices. Output display devices such as laser printers, plotters, and other printing devices produce an image or "visual representation" onto a sheet of paper or the like, while output display devices such as computer monitors develop visual representations on a computer screen.

Many output display devices receive display data in the form of a "bitmap" or "pixel map" and generate visual representations from the display data. A pixel is a fundamental picture element of a visual representation generated by a display device, and a bitmap is a data structure including information concerning a number of pixels of the representation. Bitmaps that contain more than on/off information are often referred to as "pixel maps." As used herein, both bitmaps and pixel maps are referred to as "bitmaps."

A printer can print dots on a piece of paper corresponding to the information of a bitmap. Alternatively, a computer monitor can illuminate pixels based upon the information of the bitmap. A "raster" output device creates a visual representation by displaying the array of pixels arranged in rows and columns from the bitmap. Many output devices are raster output devices. Typically, a "page" of pixels corresponding to a printed or displayed page is received and stored in memory before the pixels are displayed by the output display device.

A visual representation can contain a number of image types, including text, graphics, photographic images, and so on. Data of these types can be efficiently stored in files with other image information as high level "objects." An "object," as referred to herein, is the data and attributes defining a particular visual representation. The objects can be edited or otherwise manipulated using an application program ("software") running on a computer. When displaying the objects with an output display device such as a printer or display screen, the objects are typically first rasterized (or "rendered") into bitmaps. The output display device stores display bitmap data in memory before displaying a page of data.

A problem in the prior art methods of providing bitmaps to output display devices is that a large amount of storage space is required to store the bitmap before it is displayed. Storage space requirements have increased as the demand for high-resolution representations with more realistic attributes has become more prominent. For example, using a laser printer capable of printing black-and-white bitmaps at a resolution of 600 dots per inch (dpi), a typical displayed page (8.5×11 inches) requires about $3.8 \times 10^6$ bytes of memory. When printing a page of color pixels, for example, having 4 colors per pixel and 8 bits per color, the memory requirement increases to about $121 \times 10^6$ bytes of memory. With such memory requirements, a significant portion of the cost of manufacturing an output display device capable of processing one or more pages such as a laser printer is the cost of the required memory.

A method that has been used to reduce the memory requirements for displaying high-resolution images involves the compression of the bitmap data according to a compression method or algorithm. A compression algorithm can significantly reduce the space needed to store bitmaps by removing redundancy. Some compression algorithms are "lossless," meaning that they compress data and reduce storage requirements with no loss of information. This type of compression is often used with text objects and the like, since bitmaps of text objects typically contain considerable redundancy allowing for significant compression. Lossless compression techniques are ideal for text objects because any loss of information during the compression and subsequent decompression processes would adversely affect appearance and legibility of the text. Other types of compression algorithms are "lossy," meaning that they compress data with some loss of information. These types of compression algorithms are typically used with image bitmap data, photographs and the like, since the loss of information can often be unnoticeable in a high resolution image.

When the compressed bitmap is to be displayed, it is decompressed using a corresponding decompression algorithm and sent to a print engine, monitor, or other output display device.

SUMMARY

The present invention provides a method and apparatus for compressing a two dimensional image. A method of compressing a two dimensional image represented as a raster of pixels. The method includes receiving a sequence of the pixels in raster order; and defining a first match pixel location and a second match pixel location relative to a current pixel location in the raster, a first match pixel being the pixel at the first match pixel location relative to the current pixel, a second match pixel being the pixel at the second match pixel location relative to the current pixel, where the first pixel location and the second pixel location are not contiguous in the sequence. Each pixel in the sequence is considered in turn as the current pixel. The method then includes comparing the current pixel only to the first match pixel and the second match pixel and then encoding the value of the current pixel if the value of the current pixel does not match the value of the first match pixel or the value of the second match; and otherwise if the value of the current pixel matches the value of the first match pixel then encoding the current pixel as a first token where the first token includes a reference to the first match pixel and a length and where the length is determined based on a number of consecutive pixels relative to the current pixel whose values match the values of similarly located pixels relative to the first match pixel; or if the value of the current pixel matches the value of the second match pixel then encoding the current pixel as a second token where the second token includes a reference to the second match pixel and a length and where the length is determined based on a number of consecutive pixels relative to the current pixel whose values match the values of similarly located pixels relative to the second match pixel.

Aspects of the invention can include one or more of the following features. The previous pixel can be the pixel immediately previous in the current scan line or a last pixel in an immediately previous scan line if the current pixel is the first pixel in the current scan line. The located pixel can be positioned in an immediately previous scan line above the current scan line and directly above the current pixel or positioned adjacent to a pixel in the immediately previous scan line and above the current pixel.

The length can be unbounded.

The method can include encoding the length including storing a code and a value. The code can be representative of a range of length values that are encoded and the value indicative of an exact length value within the range. The method can include gathering statistical data during the compression process and re-encoding the image. Tokens can be classified into groups and statistical data can be gathered on how often each token group type is used.

The method can include gathering statistical data for a number of encoded tokens having lengths falling within each of a number of predetermined ranges of lengths.

The pixel value can be encoded as a literal if the pixel value does not match the previous or located pixel value. The encoding of a literal can include encoding the value of the current pixel in accordance with a predefined mathematical algorithm operating on the value of the current pixel value. The mathematical algorithm can include determining a distance between the current pixel value and a value of a pixel immediately preceding the current pixel in the current scan line and encoding the distance.

In another aspect, the invention provides a method of compressing a two-dimensional image. The two-dimensional image is divided into a sequence of scan lines where each scan line includes a sequence of pixels and where each pixel has an associated value representative of a shade to be rendered when displaying the two dimensional image on a raster output device. The method includes processing pixels in raster order including, for each pixel in a current scan line, comparing a pixel value of a current pixel with values of a plurality of previously processed pixels in the current or previous scan lines. If a match is detected, then the method includes encoding the current pixel as a copy of a matching pixel in the current or previous scan line and a length where the length is determined based on a number of consecutive pixels after the current pixel that satisfy a matching criterion. The matching criterion is defined by a relationship between the current pixel and the matching pixel. If the value of the current pixel does not match the value of the matching pixel(s) then the pixel value is encoded.

In another aspect, the invention provides a method of generating a compressed representation of a two-dimensional image where the image is described as a sequence of pixels in raster order. The method includes receiving the two-dimensional image as a sequence of pixels in raster order. For each pixel, the method includes determining whether the pixel is part of a first string of pixels that is identical to a second string of pixels found previously in the image at one of a plurality of preselected fixed distances from the first string of pixels. If so, the first string of pixels is encoded as a reference to the second string of pixels. Otherwise, the pixel is encoded.

Aspects of the invention can include one or more of the following features. One of the preselected fixed distances can be one pixel, thereby allowing a first string of pixels to be encoded as being identical to a second string of pixels that occurred one pixel earlier in the two-dimensional image. One of the preselected fixed distances can be a length of one scan line of the two dimensional image, thereby allowing a first string of pixels to be encoded as being identical to a second string of pixels that occurred directly above the first string of pixels on the previous scan line. The number of preselected fixed distances can be two. One of the preselected fixed distances can be one plus a length of one scan line of the image, thereby allowing a first string of pixels to be encoded as being identical to a second string of pixels that occurred on the previous scan line, one pixel to the left of the first string of pixels. The number of preselected fixed distances can be fewer than a maximum of the preselected fixed distances. A maximum length of a first string of pixels that may be encoded can be unbounded.

The step of encoding the pixel as a reference to the second string of pixels can include encoding the pixel as a token. The token can be encoded using a reference to a previous pixel and a length. The token can be encoded based on one or more previously encoded tokens immediately preceding a current token. The current token can include only length data. A value for all pixels in a string encoded by the current token can be derived by evaluating one or more previous tokens.

The method can include encoding a single pixel as a ranking based on a distance of its value from the value of a previous pixel. The step of encoding the first string of pixels as a reference to the second string of pixels can include dividing tokens into groups and encoding a token by encoding its group and encoding the particular token within a given group with a code. The token within a group code can be variable length.

In another aspect, the invention provides a method of generating a compressed representation of a two dimensional image as a sequence of encoded tokens. Each token represents either a first string of pixels that is identical to a second string of pixels that occurs previously in the image or a single encoded pixel value. The image is in the form of an uncompressed representation and includes a sequence of pixels in raster order. The method includes receiving the sequence of pixels and for each pixel, determining whether the pixel is part of a first string of pixels that is identical to a second string of pixels found previously in the image at one of a plurality of preselected fixed distances from the first string of pixels. If so, the pixel is encoded in the first string of pixels. Otherwise, the pixel is encoded.

In another aspect, the invention provides a method of generating an uncompressed representation of a two dimensional image as a sequence of pixels in raster order (given a compressed representation of the image as a sequence of encoded tokens where each token represents either a first string of pixels that is identical to a second string of pixels that occurs previously in the uncompressed representation of the image or single encoded pixel value). The method includes sequentially retrieving the encoded tokens and decoding each encoded token. If a token represents a first string of pixels, the first string is outputted by copying a second string of pixels specified by the token. Otherwise, a particular pixel specified by the token is outputted.

In another aspect, the invention provides a digital output processing system with object compression and decompression for processing a two dimensional image. The system includes a rasterizer which converts data objects into bitmap objects and a compressor operable to receive the bitmap objects as a sequence of pixels in raster order and for each pixel: determine whether the pixel is part of a first string of pixels that is identical to a second string of pixels found previously in the two dimensional image at one of a plurality of preselected fixed distances from the first string of pixels, if so, encoding the first string of pixels as a reference to the second string of pixels, and otherwise, encoding the pixel. The system includes a decompressor which decompresses the compressed bitmap objects.

Aspects of the invention can include one or more of the following features. The compressor and decompressor can be implemented in an output device. The output device can be one of the group consisting of a printer device and a screen display. The system can include a mechanism for dividing the bitmap objects into nonintersecting regions, wherein the compressor compresses the regions.

Implementations of the invention can include one or more of the following advantages. Object data can be compressed using two or more types of tokens. The compression process can include entropy encoding techniques for optimizing the compression for a typical page or the compression can selectively be optimized for the particular page being compressed using a two part compression process. In the first pass, tokens are generated based on the data to be compressed while statistics are gathered about the particular page being compressed. At the end of the first pass, the resultant product is a compressed bitmap and information describing how much more compressed the bitmap could be using the statistics information. The process can end after the first pass or improvements to the compression can be realized by invoking a second pass. In a second pass, the tokens can be re encoded using entropy encoding techniques to optimize the encoding for the particular page of content. This permits a dramatic reduction in memory space requirements with no loss of image quality. With less memory requirements for storing displayed data, the cost to produce an output display device can be drastically decreased. In addition, the compressed data can be easily decoded in real time to support printing operations.

These and other advantages of the present invention will become apparent to those skilled in the art upon a reading of the following specification of the invention and a study of the several figures of the drawings.

BRIEF DESCRIPTION OF THE DRAWINGS

FIG. 5a-5d are block diagrams illustrating the structure of entropy encoded tokens.

DETAILED DESCRIPTION

The present invention is well-suited for reducing the storage space requirements for rasterized data that is to be sent to an output display device. However, the present invention can also be used generally to reduce storage requirements when storing data of different types for a variety of purposes.

A number of terms are used herein to describe images and related structures.

"Visual representation" refers to the image produced by an output device on a sheet of paper, display screen, and so on.

The term "image" is used to describe a type of visual representation or "object type."

"Pixel" refers to a single picture element of a displayed visual representation. Each pixel is composed of one or more components, one for each primary color (e.g., cyan, magenta, yellow and black) used in a particular color system. Each component, in turn, uses one or more bits to represent a gray scale value. In some color printers, the primary color "planes" are printed sequentially, so the compression and decompression methods of the invention process one gray scale plane at a time. Taken collectively, the pixels form the representation.

"Bitmap" refers to bits stored in digital memory in a data structure that represents the pixels. As used herein, "bitmap" can refer to both a data structure for outputting black and white pixels, where each pixel either is on or off, and a "pixel map" having more information for each pixel, such as for color or gray scale displays. The pixels of a bitmap are stored in "raster" order, as a collection of scanlines ordered, say from top to bottom, where the pixels of each scanline are ordered, say from left to right.

"Band" refers to a collection of sequential scanlines.

"Raster" refers to the arrangement of pixels on an output device that creates a visual representation by displaying an array of pixels arranged in rows and columns. Raster output devices thus include laser printers, computer displays, video displays, LCD displays, and so on.

"Render" and "rasterize" refer to the creation of an object bitmap from object primitives, such as a character outline or object in a display list. Both object primitives and object bitmaps are referred to as "objects" herein, where an "object" includes type and location information as well as data describing a visual representation which is to be derived from the object.

"Literal" refers to a representation for a single pixel that is not a string reference. A literal is a token that encodes a value for a single pixel.

Figure 1:
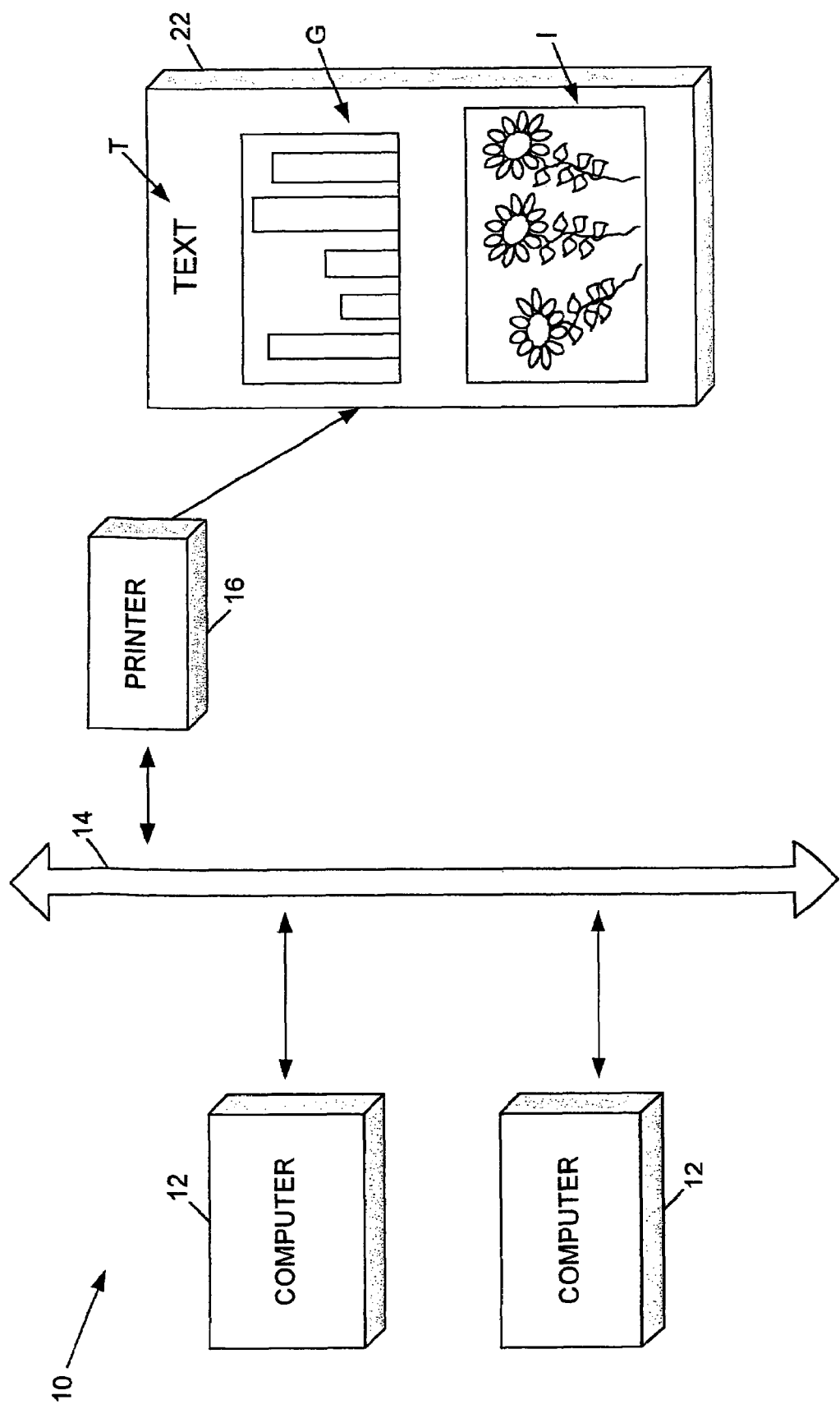
FIG. 1 is a block diagram of a computer system for displaying a page in accordance with the present invention.

In FIG. 1, a computer system 10 suitable for reducing storage requirements in the display of visual representations includes one or more digital computers 12, a communications bus 14 and an output display device.

Digital computers 12 can be personal computers (such as an IBM-PC AT-compatible or Apple Macintosh personal computer), workstations (such as a SUN or Hewlett-Packard workstation), and so on. Digital computers 12 typically each include a microprocessor, a memory bus, random access memory (RAM), read only memory (ROM), peripherals such as input devices (keyboard, pointing device, voice recognizer, and so on.), and storage devices (floppy disk drive, hard disk drive, and so on.). In an alternate implementation, display data can be sent to other memory devices or storage devices instead of being sent to an output display device.

The output display device can be a printer, a display, or other output device. Other output display devices include projection devices, plotters, and so on. For the purposes of this disclosure, reference will be made to a printer device 16.

Printer device 16 is an output display device that can produce a printed visual representation of a displayed page 22 on a piece of paper, a transparency, and so on. In one implementation, printer device 16 is a raster device which creates the visual representation with a plurality of printed dots arranged in rows and columns corresponding to a bitmap. That is, a bitmap can be input to printer device 16 and the bits of the bitmap can be displayed as pixels. Alternatively, higher-level objects can be sent to printer device 16, and printer device 16 can perform the rasterization process.

To display visual representations on an output display device, such as printer device 16, one or more types of procedures can be implemented. One procedure is to input data objects, and then rasterize bitmaps from the objects. For example, the object of a text character can include associated information which specifies how the character is to be displayed, such as positional coordinates, size, font, and so on.

A well known page description language for specifying objects and related information is the PostScript® language by Adobe Systems, Inc. of San Jose, Calif. The object can, for example, include a bitmap describing a text character, or the object can reference or point to stored character outlines which describe the shape of a character and includes other rasterizing information, such as font and size. A well-known character outline format is the Type 1® format, by Adobe Systems, Inc. In addition, objects such as graphical shapes can be stored as graphic primitives, which are basic shape objects used to form more complex graphical shapes. From the objects, the computer 12 or printer device 16 can rasterize a bitmap and either send the bitmap to a memory or other storage area that is accessible for display or store the bitmap for later use.

The process of the present invention, as described below, provides a technique for manipulating bitmaps derived from objects so that less storage space is required when displaying the objects. As referenced herein, a page description language or "PDL" file is a file or similar storage unit which includes objects stored in a page description language such as PostScript or Portable Document Format™ (PDF™) by Adobe Systems.

Displayed page 22 includes visual representations produced by the output display device (printer device 16). Herein, a "page" of displayed data refers to a block or group of visual representations that can be viewed by the user as a unit. For example, a page of displayed representations from a printer device 16 can be the representations shown on a single sheet of paper (or more sheets, if a page is defined to span multiple sheets of paper). In page description interpreters such as the PostScript interpreter, a page of data is typically interpreted, processed and sent to an output display device before the next page is processed.

Figure 2:
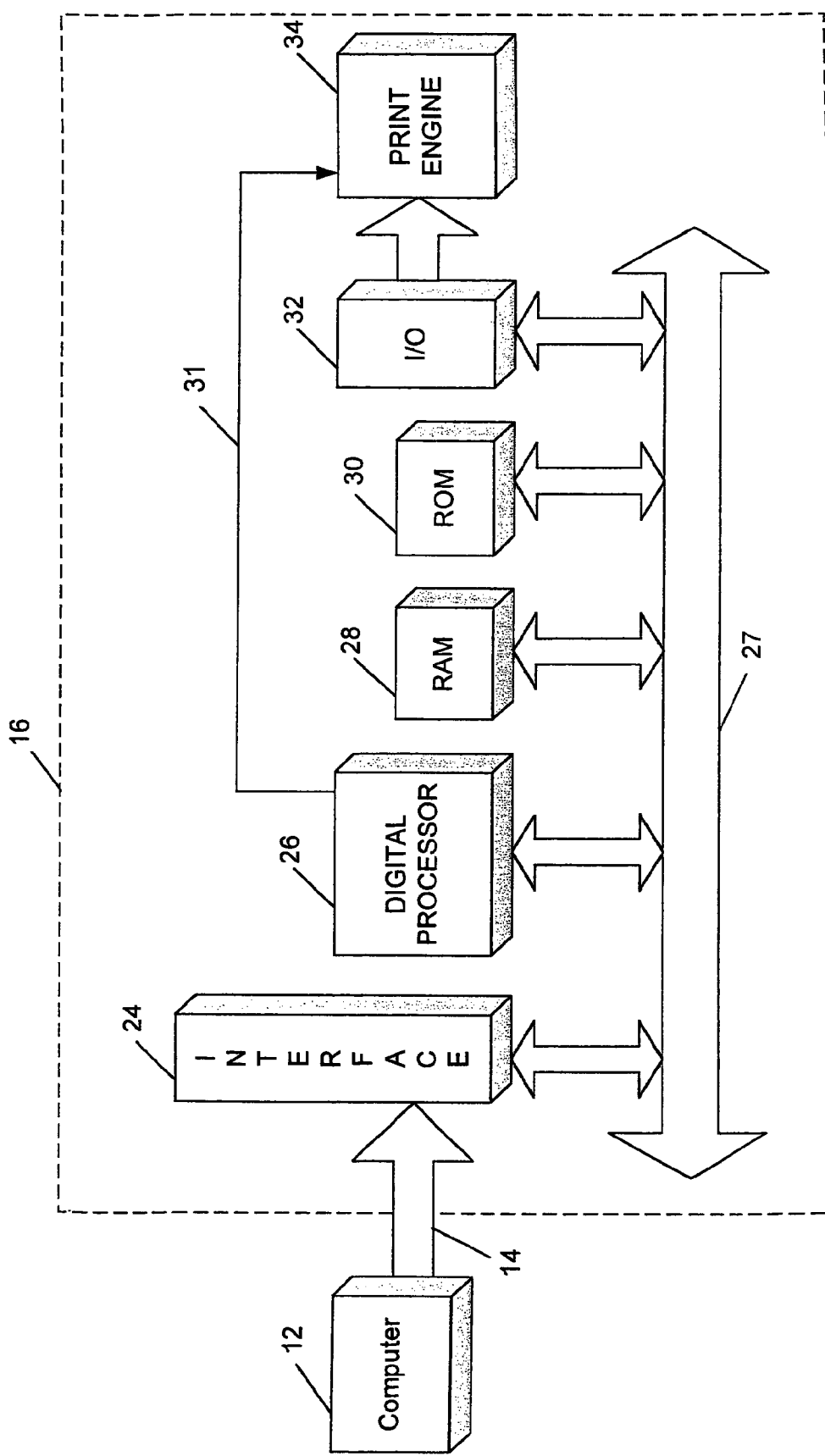
FIG. 2 is a block diagram of an output device suitable for use with the present invention.

FIG. 2 is a block diagram of an output display device which, as an example, will be described as printer device 16. Printer device 16 preferably includes an interface 24, a digital processor 26, RAM 28, ROM 30, I/O interface 32, and print engine 34. Interface 24 is used to transfer information from computer 12 received on bus 14 to RAM 28 and from RAM 28 (or ROM 30) to computer 12.

Digital processor 26 includes one or more digital integrated circuits used to control the operation of printer device 16. Using instructions retrieved from memory (i.e., RAM 28 or ROM 30), processor 26 controls the reception and manipulation of input data and the output and display of data on output devices. In one implementation, a function of processor 26 is to rasterize object data into bitmaps. This is typical of PostScript printers.

Digital processor 26 preferably receives commands and data in a page description language (PDL), such as PostScript, from computer 12 (through interface 24) and interprets/executes the commands to rasterize a bitmap. The uncompressed bitmap is typically stored in RAM 28. The uncompressed bitmap may represent an entire page, or more typically, a band of data. Digital processor 26 then compresses the band (or whole page), which it also stores in RAM 28. The process of reading PDL for a band, rasterizing it, compressing it and storing the compressed raster data in RAM 28 is repeated until an entire page of data is processed.

After an entire page has been compressed, digital processor 26 can begin the decompression process by decompressing bands, one at a time, into RAM 28. The uncompressed bands can be sent through interface 32 to print engine 34 for printing. Digital processor 26 makes use of other components in the printing device, such as RAM 28 and ROM 30. Digital processor 26 is described in greater detail with respect to FIG. 2a.

Bus 27 is used by digital processor 26 to access RAM 28 and ROM 30, which are memory components used to store data required by printer device 16 to process and display output data. RAM 28 is used by digital processor 26 as a general storage area and as scratch-pad memory, and is preferably used to store input data and the compressed data produced by the present invention. RAM 28 can be implemented with one or more memory chips. ROM 30 can be used to store instructions followed by digital processor 26 as well as character outlines and object primitives used to display visual representations in a specific format. For example, when rasterizing text objects such as characters, the characters' associated character outlines can be referenced in ROM 30 or RAM 28.

I/O interface 32 is used to interface the bitmap data generated by digital processor 26 with the print engine 34. Output bitmap data can, for example, be sent to I/O interface 32 via bus 27. I/O interface 32 provides the bitmap data to print engine 34, which uses the bitmap data to produce a display page 22 as shown in FIG. 1. The print engine of a laser printer, as is well known to those skilled in the art, typically includes such components as a toner mechanism for applying a visual representation to a piece of paper, feeding mechanisms, and other components required to produce a displayed page. If an output device such as a display screen is being used, the print engine can be a CRT or other actual screen which displays visual representations derived from the bitmap. Alternatively, output bitmap data can be sent directly to print engine 34 from processor 26 via direct line 31.

The components shown in printer device 16 in FIG. 2 can alternatively be included in computer 12 rather than printer device 16 or any other output display device. For example, digital processor 26, RAM 28, ROM 30, and I/O 32 can be included in computer 12 and can provide output bitmaps to print engine 34 located in the output display device.

The compression of displayed data, as described below, is implemented by digital processor 26 and can be accomplished on computer 12; the decompression of this data can then be implemented on an output device. In such an embodiment, a description of the compression algorithm used would be sent with the compressed data so that the output device could understand the compression algorithm and decompress the data.

In an alternate implementation, computer 12 can send compressed data to a storage device (not shown), such as a hard disk drive, floppy disk, PCMCIA card, magnetic tape, and so on, for storage prior to displaying the data.

Figure 2A:
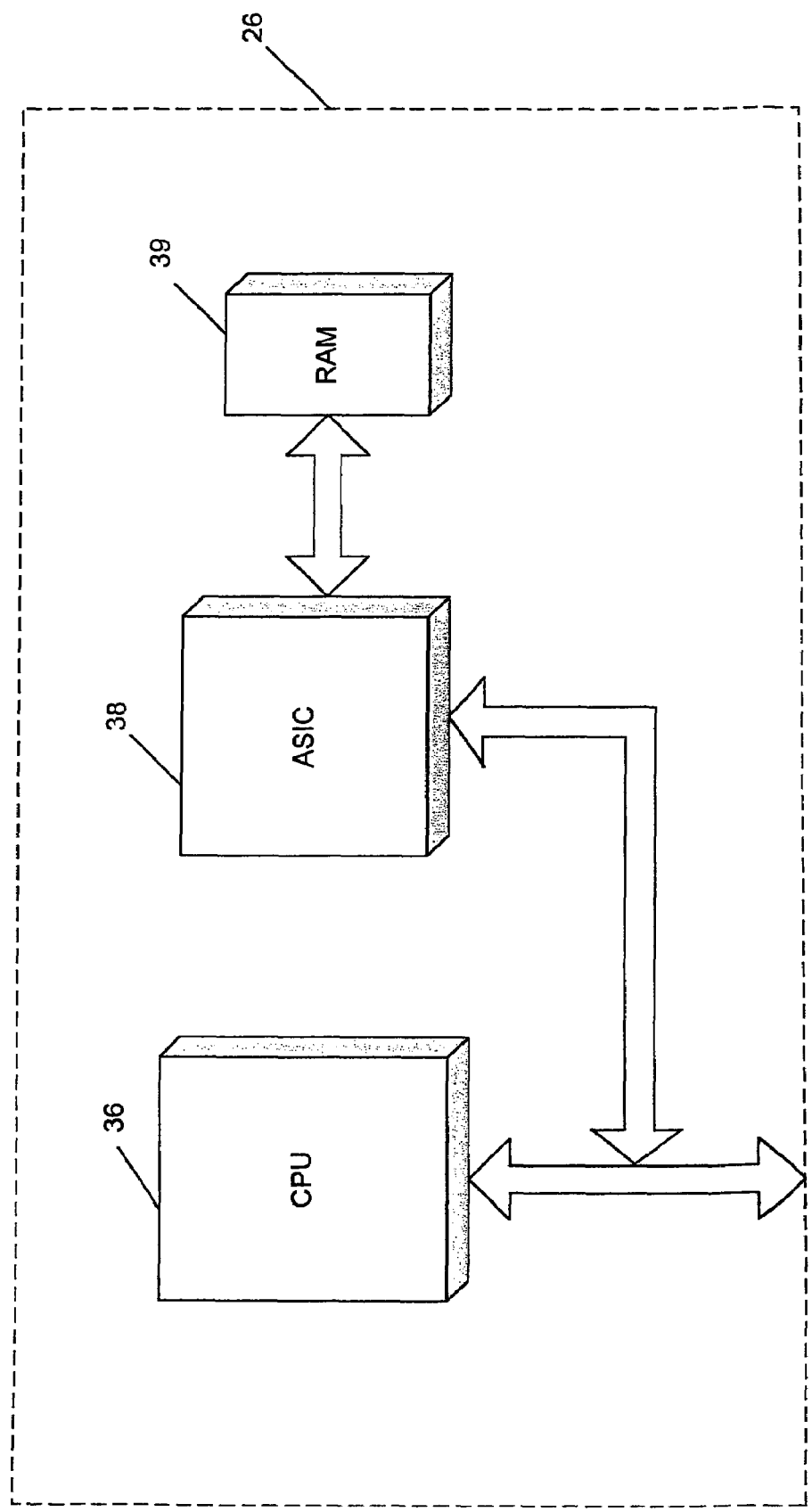
FIG. 2a is a block diagram of a digital processor as shown in FIG. 2.

FIG. 2a is a block diagram of digital processor 26 shown in FIG. 2. In one implementation, processor 26 includes a CPU 36 and an application specific integrated circuit (ASIC) 38. CPU 36 is preferably a general purpose microprocessor which controls the operation of printer device 16. CPU 36 can be a single-chip processor or can be implemented with multiple components.

In one implementation, ASIC 38 is an integrated circuit designed to perform the compression and decompression operations. ASIC 38 can be coupled to a main CPU bus directly, or could be interfaced through a bus translator interface (not shown). Alternatively, ASIC 38 could be interfaced through to CPU's 36 secondary bus. In either configuration, ASIC 38 requires master access to RAM 28. ASIC 38 uses compression algorithms that are preferably implemented in hardware in the ASIC. The compression algorithms are selected by software routines implemented by CPU 36 to compress bitmaps so that the bitmap will require less space to be stored. ASIC 38 also uses decompression algorithms for decompressing the compressed bitmaps back to their original size and form using parameters specified in the compressed data. In other implementations, compression and decompression can be performed by software or by other hardware components in the computer system. A RAM 39 can also be implemented locally to ASIC 38 to store structures and data used during compression and decompression.

Many compression/decompression algorithms are known to those skilled in the art and some are described below. The present invention utilizes either a one or two pass compression technique to achieve an efficient reduction in required storage space for a bitmap that is to be displayed with no loss of display quality, as described below.

Figure 3:
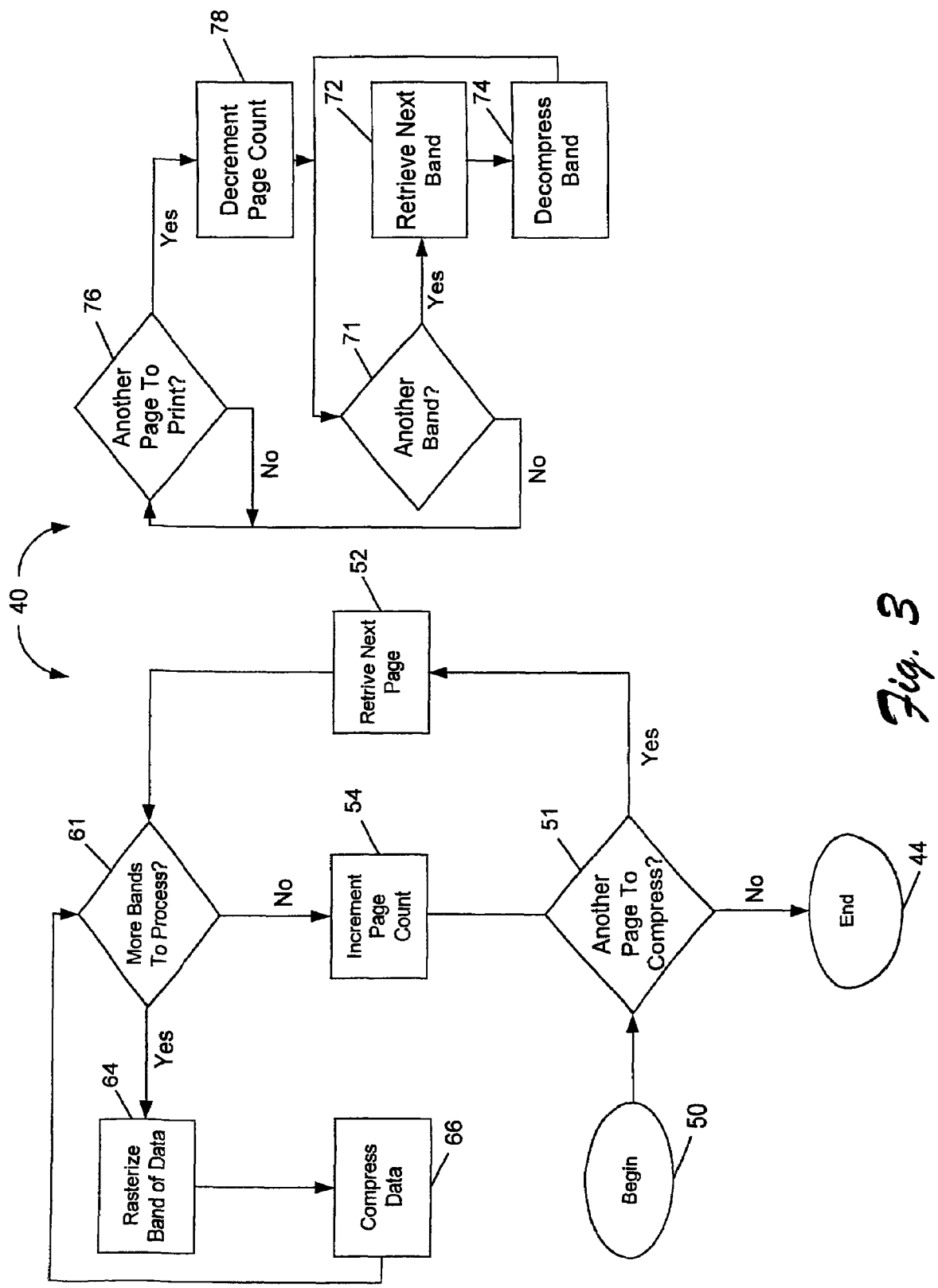
FIG. 3 is a flow diagram illustrating a process for compressing data.

FIG. 3 illustrates a process 40 for displaying data with reduced storage requirements according to the present invention. The process comprises two related flow diagrams, one for compression (steps 44 through 66) and one for decompression (steps 71 through 78).

One or more pages of content (input data) can be rasterized and then compressed. The process begins (step 50) and checks to determine if there is at least one more page to prepare for printing (step 51). If one or more pages are identified, processing continues for a next page (steps 52 and 61). Otherwise, the compression process is complete as indicated at step 44.

A check is made to determine if there is at least one more band to compress for the current page (step 61). If so, then processing can continue with the next band (step 64). Otherwise, at step 54, a count of pages ready to print is incremented and the process resumes at step 51. At step 64, a single band's content of input data is rasterized and then compressed in step 66, from which the process continues to step 61. The process of rasterizing an object into a bitmap object is well known to those skilled in the art. For example, if a text object is to be rasterized, procedures and character outlines stored in ROM 30 can be referenced and used to create the rasterized bitmap of the characters of the text object. If a graphics object is to be rasterized, then the graphics primitives making up the graphics object are rasterized according to established methods and combined to form the rasterized graphics bitmap. A process for rasterizing objects within display lists into bitmap objects in bands is described in greater detail in co-pending and commonly owned application entitled "Apparatus for Reducing Storage Requirements for Display Data", Ser. No. 08/995, 437, filed Dec. 22, 1997 by Richard Fall, et al., the contents of which are expressly incorporated herein by reference.

Referring now to the decompression process prong of process 40, the decompression process waits at step 76 until there is a page that can be printed, i.e., until the count of pages ready to print is nonzero (step 54). The decompression process begins and the count of pages ready to print is decremented at step 78. If there is at least one more band to be decompressed for this page (step 71), the process turns its attention to the next one (step 72). Otherwise control returns to step 76, to determine if more pages are ready to print. In step 74, one band is decompressed and printed. The decompression process then continues at step 71.

In step 74, the digital processor decompresses a compressed band that has been stored in memory and sends the decompressed data to the display engine. Data in a band can be sent directly to the display engine to be displayed as soon as it has been decompressed. The page has been completely displayed when all compressed bands have been displayed. In an alternate implementation, the compressed band is decompressed and stored in a different memory or storage area for multiple uses, including display. The process of decompressing and displaying the bands of data is described in greater detail with respect to FIG. 5.

Preferably, a page of data can be compressed concurrently with the display of a previous page in a document or other group of pages. For example, as data from the first page is still being decompressed or displayed in step 74, the second page in the document can be rasterized and compressed in steps 64 and 66 concurrently. Similarly, multiple pages can be decompressed concurrently. For example, multiple decompression engines can decompress multiple pages wherein each decompression engine decompresses and displays a certain color or shade on a side of a page. Each page can be assigned to one or more decompression engines, where each decompression engine receives a next page when it finishes with its current page. Such a process can also be used with the compression and rasterization of the present invention.

Figure 4A:
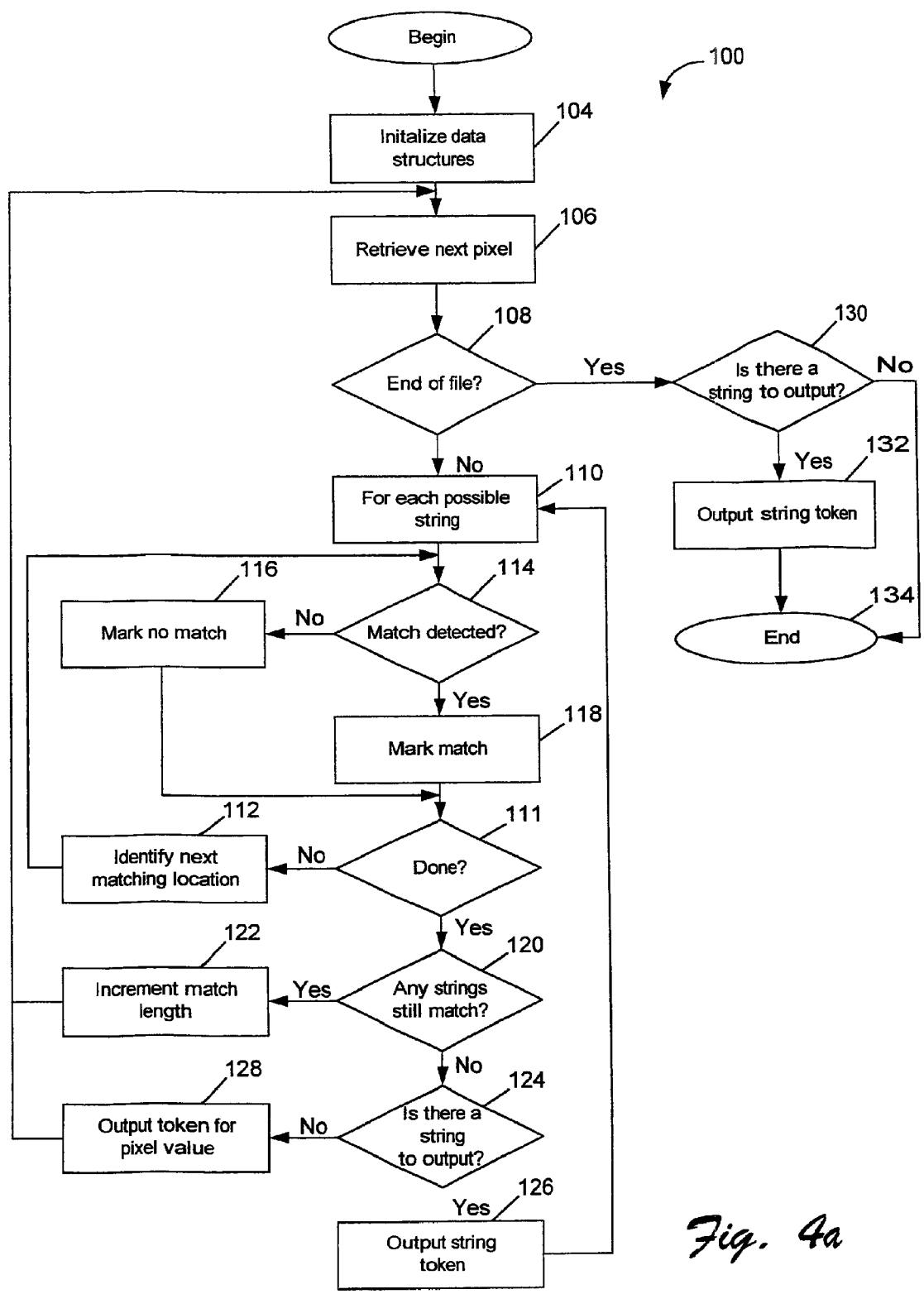
FIG. 4a is a flow diagram illustrating a process of compressing raster data.

FIG. 4a is a flow diagram illustrating a first portion of the compression process for input data associated with step 64 of FIG. 3. The process begins at step 104, by initializing various internal data structures.

In step 106, the next pixel if any of the uncompressed bitmap is retrieved. (Initially, the "next" pixel is the first pixel of the bitmap.) In step 108 if there are no more pixels to process, control transfers to step 130; otherwise, control transfers to step 110.

In step 110, the process prepares to compare the "current" pixel just retrieved in step 106 with zero or more pixels retrieved earlier, to determine whether the current pixel is part of a string of pixels that is identical to a string of pixels that was retrieved earlier in the band.

In step 114, the process first checks an internal data structure to determine whether the string of pixels immediately preceding the current pixel and of the "current length" matches a string of pixels that was seen a fixed distance earlier in the raster data stream of the bitmap. In the event that the current pixel is less than the fixed distance from the beginning of the bitmap, there is no earlier pixel in the bitmap to compare to the current pixel, so in one implementation the current pixel is instead compared to a fixed value. Alternatively, in another implementation, the comparison is omitted and the result taken to be a non-match.

Following step 114, the process records whether there was a match (step 118) or not (step 116).

If there is at least one more fixed distance to check (step 111), then the next such distance is identified (step 112) and then checked (steps 114-118).

In one implementation of the compression process illustrated in FIG. 4a, the process maintains a circular buffer cache of the most recently fetched input pixels, equal in size to the maximum of the fixed distances at which pixels are checked for string matches. The cache can be updated at step 120, by overwriting the oldest pixel with the current pixel. At step 114, the process uses the cached pixel values. The cache can be stored in RAM 39, which ASIC 38 can access more rapidly than RAM 28, where the uncached bitmap is typically stored. In one implementation, the cache can be initialized to include fixed values for all the pixels at initialization (step 104), allowing for references outside the bitmap to be references to fixed-valued pixels.

When all potential match strings have been checked, control passes to step 120. At that point, if the current pixel matched any of the pixels at one of the fixed distances earlier, then the current length of the match string is incremented in step 122, and control returns to step 106 to fetch the next pixel. Otherwise, control passes to step 124. Also, in step 122, for each string match candidate the current pixel was found not to match the corresponding pixel of that string, then the string match candidate is set to "non-match." In step 124, if the current length is nonzero, then in step 126, a token representing a matched string is encoded and output. If more than one string matches, the first such string is selected. The current length is set to zero, and the data structure for all string candidates are set to "match." Note, however, that the current pixel does not change. Rather, control passes to step 110, where the current pixel is given an opportunity to become the first pixel of the next string reference.

However, if at step 124 the current length is zero, then at step 128 a token representing the literal value of the current pixel is encoded and output, because the current pixel can't be represented as a string reference. Then control passes to step 106 to fetch the next pixel.

After all pixels in the bitmap have been fetched and checked for string matches, any pending final string reference is identified (step 130) and its token encoded and output (step 132). At this point the compression of the bitmap is complete.

The effectiveness of the compression process illustrated in FIG. 4*a* depends on which set of fixed distances is chosen to look for possible matches with previous strings at step 110. Each such fixed distance corresponds to a match location with respect to the current pixel.

One match location that is likely to be among the most useful is the pixel immediately to the left of the current pixel, which immediately precedes it in raster order. This match location can be used to encode strings of a constant color value.

Another match location that is likely to be among the most useful is the pixel immediately above the current pixel, which precedes it in raster order by a distance of one scan line.

The pixel to the left and the pixel above are likely to be good match locations because for most bitmaps, pixels tend to be correlated locally. That is, for most bitmaps the current pixel is more likely to be identical to pixels that are immediately adjacent than it is to be identical to pixels further away. However, for dithered bitmaps, the pixels located are dither brick width to the left and one dither brick height above the current pixel may be even more useful, because the dither bricks tend to be correlated locally.

Generally, the phenomenon of two dimensional local correlation suggests the usefulness of two match locations, one for each dimension. Note that locations below or to the right of the current pixel can't be used as match locations because during decompression these pixels will not be decoded before the current pixel, so they can't be copied from to create the current pixel.

It may be advantageous to have more than two possible match locations. Adding a match location increases the cost of encoding strings found at the others match locations, so if the new match location is to be useful, that encoding cost must be more than offset by the cost savings of finding longer strings to match at the new match location.

The match location can be located a pixel or more (not adjacent) away from the one being currently coded. The designation of a pixel more than one pixel away can be used to facilitate halftone printing when locating the pixel at an immediately preceding half tone dot.

At steps 126 and 128, the token is encoded before it is output. Entropy encoding can be used, which assigns more bits to codes representing less frequently used tokens and fewer bits to codes representing more frequently used tokens.

Many useful entropy encoding methods are well known to the art, including, but not limited to, Huffman encoding and arithmetic encoding.

Huffman encoding might be used if it is desirable that all codes have an integral number of bits. Arithmetic coding might be used if codes may have a nonintegral number of bits, to achieve best compression.

Figure 5A:
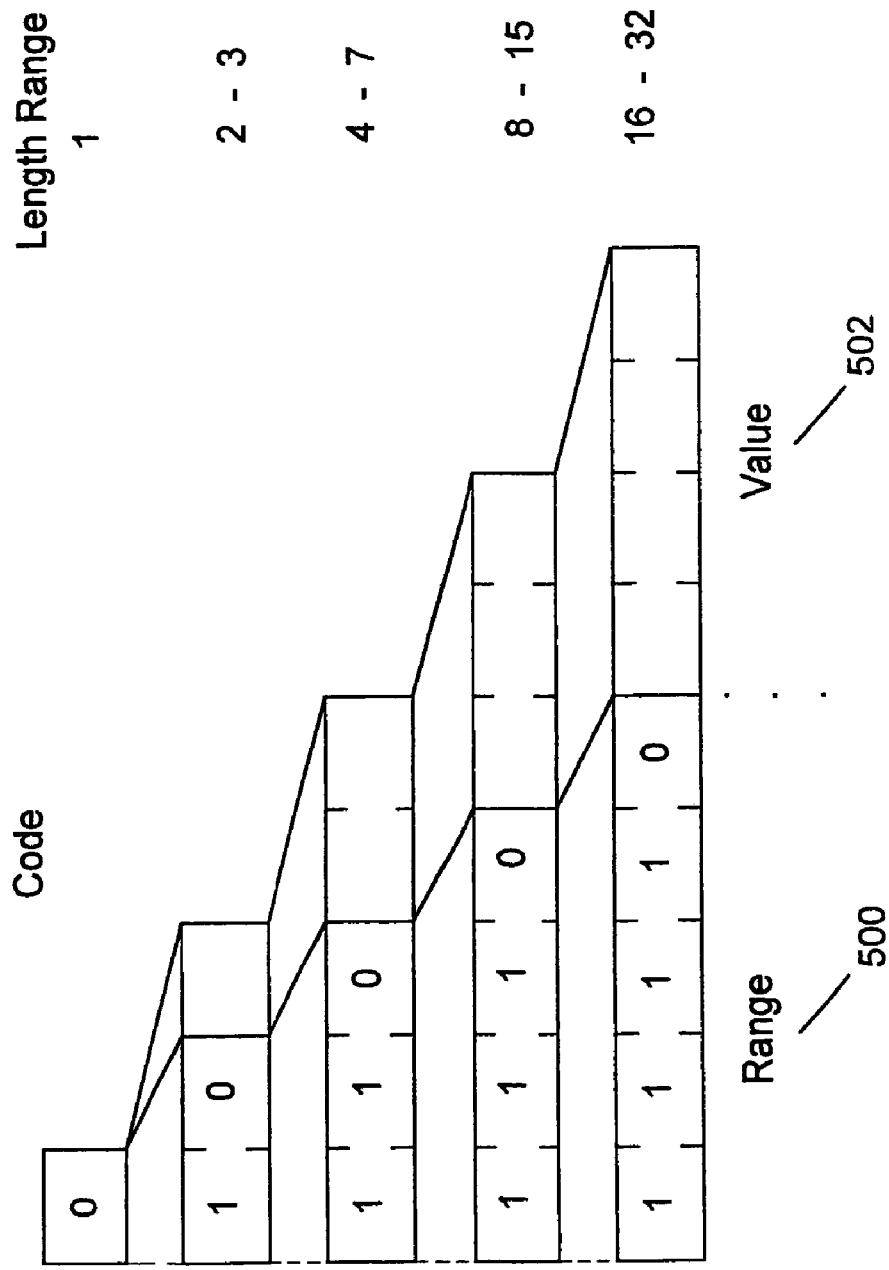

FIGS. 5*a*-5*d* illustrate how tokens can be encoded. FIG. 5*a* shows an implementation of entropy encoding for the length portion of a string reference token. The encoding consists of a unary encoding of a range of lengths 500 followed by a binary encoding of a length value 502 within that range, where the number of binary bits used to specify length within a range is one fewer than the number of unary bits used to specify the range. Note that there is no limit to the length that can be represented by such an encoding.

FIG. 5*b* shows an implementation for an entropy encoding of a single pixel that cannot be represented as part of a string reference. The encoding describes a value (for example an 8-bit gray scale value) of the current pixel as a function of its distance from the value of the previous pixel. In this implementation, a distance of zero never needs to be encoded, because one of the string references permitted is to the previous pixel. If the current pixel has the same value as the previous pixel, so that the distance is zero, then it can and must be encoded as a part of a string reference.

In the implementation illustrated by FIG. 5*b*, the 256 possible pixel values are assigned distance ranks with respect to the previous pixel value as a function of their absolute distance from the previous pixel value. The previous pixel value itself is assigned rank zero. If one pixel value is closer than another to the previous pixel value, then it is assigned a lower rank. If two pixel values are equally distant from the previous pixel value, then lesser value is arbitrarily assigned the lower rank. For example, if the previous pixel value is 3, then the distance ranking of pixels is: 3, 2, 4, 1, 5, 0, 6, 7, 8, . . . 254, 255. As shown in FIG. 5*b*, low ranking pixels tend to be encoded using fewer bits than high ranking pixels, because it is assumed that the former occur more frequently.

Further encoding techniques can be used when encoding a token for an encoded bitmap. FIG. 5*c* shows one embodiment where the entropy encoding of a next token of an encoded bitmap supports references to two previous strings as well as a single pixel encoding. This encoding uses the encoding of FIG. 5*a* to specify the length if the token encodes a string reference, and it uses the encoding of FIG. 5*b* to encode the single pixel delta value if the token is not a string reference.

In the encoding of FIG. 5*c*, a bit (the "stuffed bit") is used to indicate (in this example the fourth bit) whether the token encodes a first type of string reference (0) or a second type of string reference or a single pixel (1), except if the code starts with 0, 10, or 110. This allows first type strings up to length 7 to be encoded without suffering the overhead of the "stuffed" bit. If the token is not a first type string reference, then another bit is "stuffed" into the encoding (in this case the seventh bit), representing whether the token is a string reference (0) or a single pixel encoding (1), except if the code starts with 11110 or 111110. This allows second type strings up to length 3 to be encoded without suffering the overhead of the second "stuffed" bit.

The encoding illustrated in FIG. 5*c* is designed to use fewer bits to encode a first type of string reference than to encode a second type of string reference of the same length, because the former is expected to occur more frequently than the latter.

Entropy encoding techniques can also be used in encoding tokens dependent on the history of previously encoded tokens. In one implementation, the entropy encoding of the next token of the compressed bitmap can be designed so that a token's encoding depends not only on its type but also on the type of the previous token. For example, in one implementation, the encoding of a token depends on whether the previous token is a first type of string reference, second type of string reference, or a single pixel value. If the previous token is a single pixel value, then the current token is encoded as illustrated in FIG. 5c. However, if the previous token is a first type string reference, the current token is encoded differently, as shown in FIG. 5d. In particular, no codes need be reserved for encoding a first type string reference, because it is impossible to generate two such tokens consecutively. Instead, this would be represented as just one first type string reference. Therefore, the coding of second type string references and single pixel values can be more efficient.

Other memory saving techniques may be applied given the structure of the coding described herein. For example, if single bit deep raster data is being processed, the value of a pixel immediately following a token may be specified implicitly. If one of the designated locations is the immediately preceding pixel in the current scan line, then the value of the pixel following a token is known to be the complement of the value of the data specified in the token. This fact can be used either to increase the number of pixels coded by a token or in some other way to reduce the code size.

An entropy encoding method may adaptive, meaning that as compression proceeds, statistics are kept regarding the relative frequencies of tokens encoded recently and the codes are changed to be more efficient at encoding tokens having the observed frequencies. This method can be effective when the relative frequencies of recently seen tokens is usually a good predictor of the relative frequencies of subsequent tokens. In any case, adaptive methods are more complicated than methods where the codes remain fixed for the duration of the compression.

While the image data is being compressed in the first pass of the compression process shown in FIG. 4a, statistics can be gathered relating to the compression. In one implementation, entropy encoding techniques are used to encode the input data in a second pass including designating more bits for data that occurs less frequently and fewer bits for data that occurs more frequently in the compression.

In one implementation, the compression process illustrated in FIG. 4a can count, at step 126, how many of each type of string reference tokens occurred, for each context of previous token type. Similarly, it can count, at step 128, how many of each type of single pixel value tokens occurred, for each context of previous token type. After the entire bitmap has been compressed, these counts can be used to construct an entropy encoding ideally suited to compressing this particular bitmap. This new entropy encoding is "nonadaptive," in the sense that its codes would not change during the course of compressing the bitmap a second time, in response to statistics gathered during that compression. Instead it is constructed (i.e., adapted) in response to statistics gathered by compression already completed.

Furthermore, the count information can be used to predict exactly how many bits would be required to represent the compressed bitmap using this second encoding. Specifically, the process can calculate the sum of the coding cost of each token type multiplied by the number of times the token occurred. If it is deemed worthwhile to achieve the compression predicted, then the compression process can compress the bitmap again, using the constructed entropy encoding.

The compression process illustrated in FIG. 4a has the property that the sequence of tokens generated for a bitmap does not depend on the entropy encoding used to encode the tokens. Were this not the case, it would not be possible to know precisely how changing the entropy encoding would affect compression, without actually compressing the bitmap again.

In an alternative implementation, it would be possible to modify the compression process illustrated in FIG. 4a so that the entropy encoding did affect which tokens are generated. For example, at step 126, if a current string matched more than one previous string, the process could choose to generate the string reference token that could be encoded most efficiently. However, in that case, it would not be possible to predict compression results using a different entropy encoding.

One disadvantage of keeping a count of how many tokens of each type occur in each possible context, as described above, is that storing these counts requires a significant amount of memory. So does storing the description of the resulting entropy encoding function.

In one implementation, the burden of these storage requirements can be reduced by arbitrarily grouping token types and keeping count statistics only for the groups. For example, first type string references following a single pixel encoding could be grouped by length into the following groups: 1, 2-3, 4-7, 8-15, 16-31, and 32-or-longer. The method for encoding token types within each group is chosen arbitrarily, since no statistics are gathered to inform this choice. For example, the encoding for the length group 4-7 could be a two-bit binary field, but the encoding for the length group 32-or-longer could be a unary subfield specifying a length range followed by a binary subfield specifying length-within-range. At step 126 and step 128 of FIG. 4a, the token type's group count is incremented by one and a global token-type-within-group cost is incremented by the cost of the token's token-type-within-group encoding.

Figure 4B:
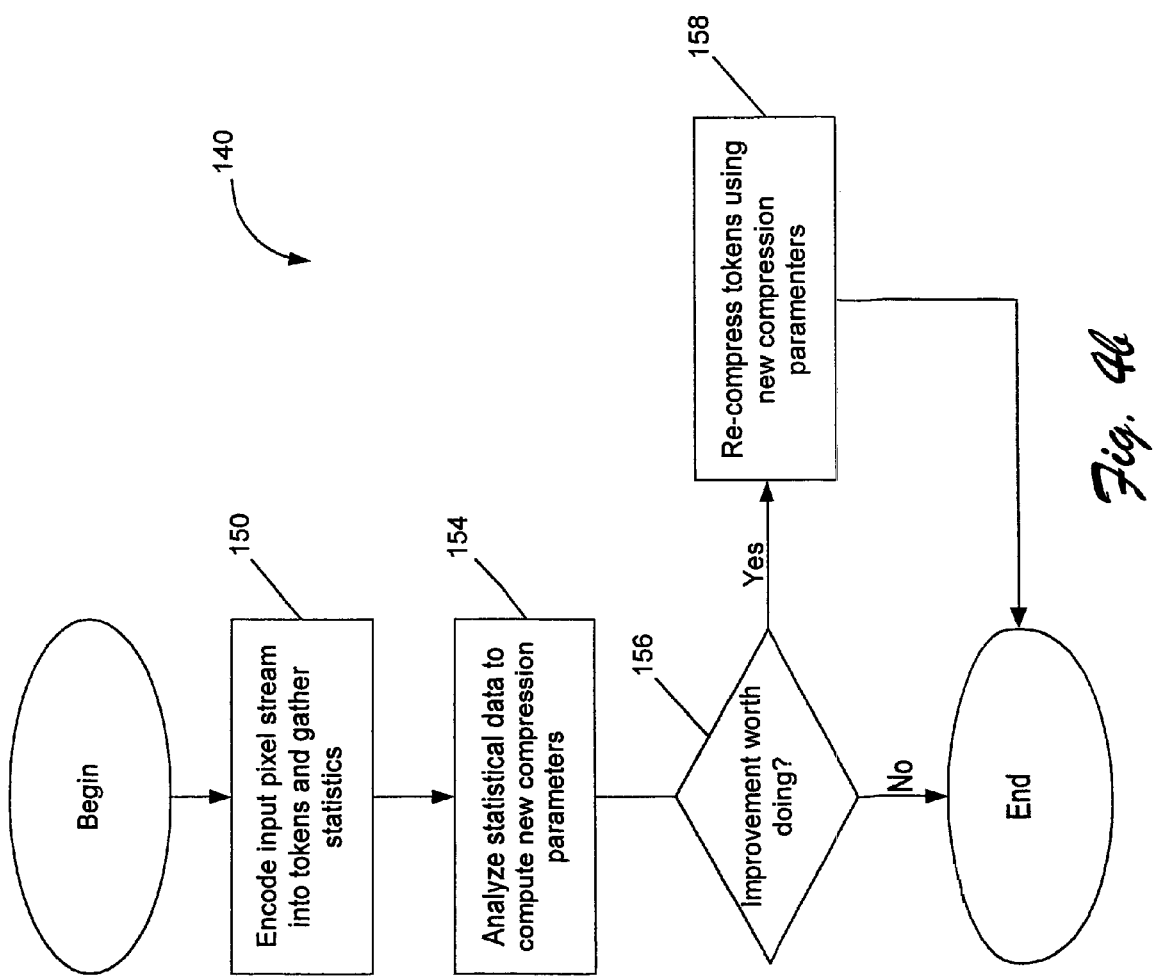
FIG. 4b is a flow diagram illustrating a two pass compression process for raster data.

At step 154 of FIG. 4b, after the entire bitmap has been processed, an optimal entropy encoding for encoding token type groups is computed and then the cost of encoding the bitmap's sequence of tokens into token groups is computed. Finally, the global token-type-within-group cost is added, to arrive at a total cost for encoding the bitmap.

Referring now to FIG. 4b, a two step compression process 140 begins by encoding an input pixel stream into tokens using an initial set of compression parameters while gathering statistical information about the tokens (150). The initial set of compression parameters includes token encoding parameters. The token encoding parameters can be selected from optimized parameters based on the type of data being compressed and can designate particular structures for use in building the tokens. For example, the compression parameters can specify the format of a token including field descriptions as well as the number of bits to be designated for each field. The parameters may correspond to an assumed set of statistics about the frequencies of tokens encoded from images similar to the image being compressed. Statistical data is gathered concurrently during the compression. Statistics may be gathered from the initial compression about the frequencies of a particular token in the image being compressed. Based on the frequency of tokens, a set of compression parameters can be selected which will optimize the coding. Since only the entropy encoding of the tokens can change between passes, the only statistics that are collected are how many times each token type occurs. After the compression is complete, the statistical data is analyzed to determine the cost and feasibility of optimizing the initial compression (154). If an improvement is worth realizing (156) based on the costs, then the tokens (input data) are recompressed (158). The process ends after the recompression or if no improvement is worth realizing after the first pass compression. Thereafter, the compressed input stream can be stored, passed to an output display device or otherwise manipulated as required.

Figure 6:
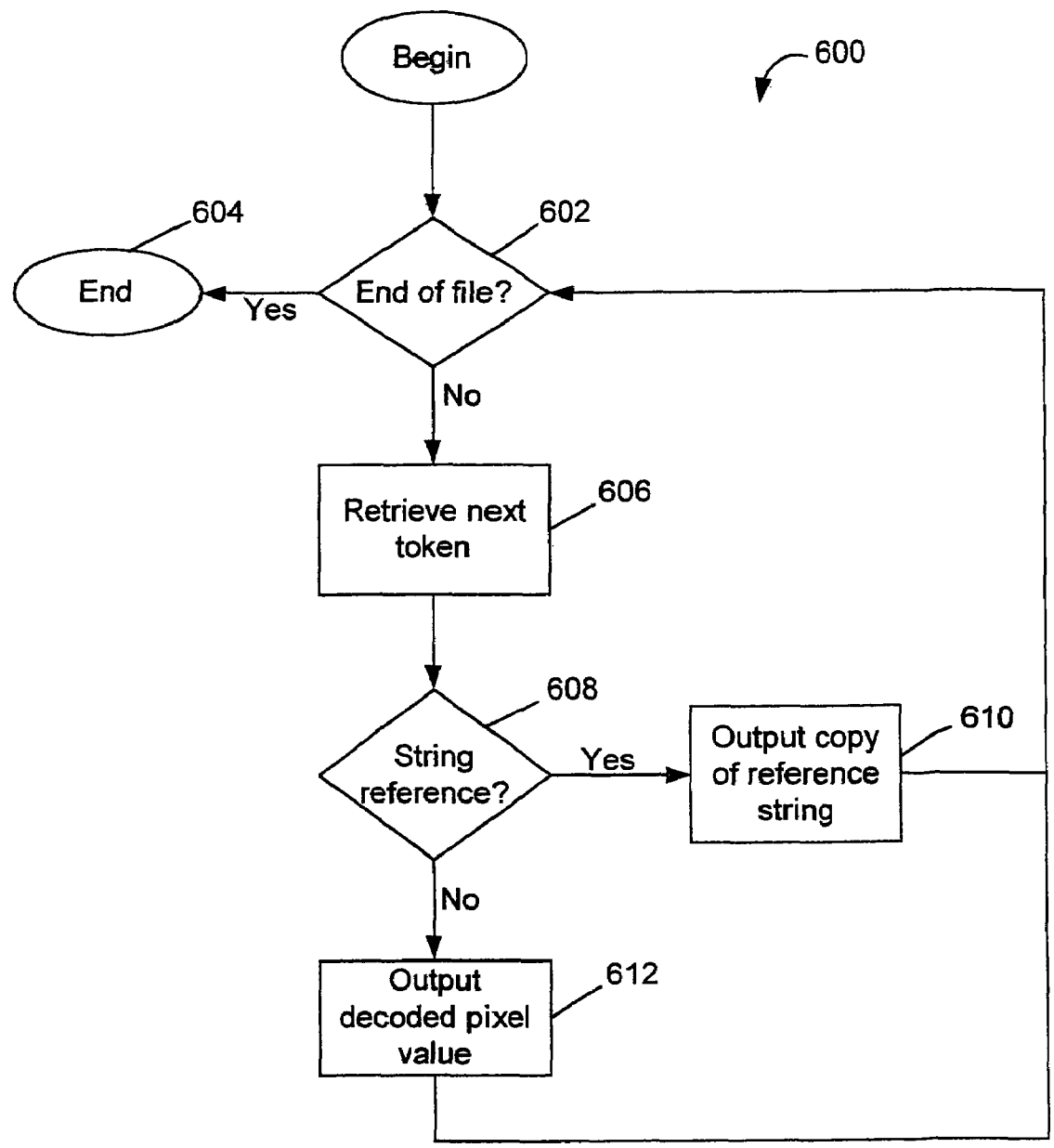
FIG. 6 is a flow diagram of a process for decompressing a bitmap previously compressed using tokens.

The process 600 for decompressing a previously compressed bitmap is shown in FIG. 6. The process begins by checking to determine if the end of the compressed bitmap has been reached (602). If so, the process ends (604). If not, the next token is retrieved and decoded (606). If the token is a string reference (608), then a copy of the reference string to which it points is outputted (610). Otherwise, the decoded pixel value is outputted (612). The process thereafter continues at step 602. A cache of the most recently output pixels can be maintained to serve as the source of string reference pixels.

The process of rasterizing and compressing output data as described in FIGS. 3, 4a and 4b can be implemented in software and/or hardware. In one implementation, the objects of the input data can be rasterized and the display lists, data structures, and so on can be stored through the use of software, while the compression/decompression can be implemented in hardware using gates, an ASIC (as shown in FIG. 2a), and so on. In other implementations, the entire process can be implemented using software (or hardware). However, a full implementation in software can cause output data to be displayed too slowly for many applications.

While this invention has been described in terms of several preferred implementations, it is contemplated that alterations, modifications and permutations thereof will become apparent to those skilled in the art upon a reading of the specification and study of the drawings. The constraints of the user ultimately determine the compression algorithms used, and these constraints can include time to compress/decompress or display the data; storage space available for the display lists, uncompressed band buffer, compressed band buffer, and so on; the quality of the resulting displayed visual representation that is derived from the objects; and other factors, such as overall page characteristics, hardware/software limitations, and so on.

Furthermore, certain terminology has been used for the purposes of descriptive clarity, and should not be construed to limit the present invention. It is therefore intended that the following appended claims include all such alterations, modifications and permutations as fall within the true spirit and scope of the present invention.

What is claimed is:

1. A method of generating a compressed representation of an image, the method comprising:
   receiving the image as a sequence of pixels in raster order;
   first encoding the sequence of pixels into first tokens based on a set of compression parameters while gathering statistical information about the first tokens, where the set of compression parameters includes token encoding parameters;
   analyzing the statistical information to determine whether a recompression of the first tokens will reduce an encoding size; and
   when recompression of the first tokens will reduce encoding size, second encoding the first tokens into second tokens based on the statistical information such that a number of bits used to represent the second tokens is less than a number of bits used to represent the first tokens.

2. The method of claim 1 where the compression parameters are selected based on a type of data being compressed.

3. The method of claim 1 where the compression parameters specify a token format.

4. The method of claim 1 where the compression parameters correspond to a set of statistics about the frequencies of tokens encoded from other images similar to the image.

5. The method of claim 1 where the statistical information includes the frequency of a particular token in the first tokens.

6. The method of claim 1, further comprising:
   selecting a set of compression parameters that will minimize the size of the second encoding.

7. The method of claim 1 where the statistical information is a number of times each token type occurs in the first tokens.

8. The method of claim 1, further comprising:
   analyzing the statistical information to determine the cost of performing the second encoding.

9. The method of claim 1 where first encoding includes:
   for each pixel, determining whether the pixel is part of a first string of pixels that is identical to a second string of pixels found previously in the image at one of a plurality of pre-selected fixed distances from the first string of pixels, where one of the pre-selected fixed distances is a length of one scan line of the two-dimensional image;
   if so, encoding the first string of pixels as a string token that is a reference to the second string of pixels; and
   otherwise, encoding the pixel as a non-string token.

10. A method of generating an image from a compressed representation of the image, the method comprising:
    receiving the compressed representation of the image as an ordered sequence of tokens;
    decoding each token in the sequence of tokens to incrementally create a sequence of image pixels in raster order, where decoding each token includes:
       determining whether the token refers to a pixel value or a string of pixels in the image pixels, the string being at one of a plurality of pre-selected fixed distances from a given pixel in the image pixels, where one of the pre-selected fixed distances is a length of one scan line of the image; and
       appending the string of pixels to the sequence of image pixels if the token refers to a string of pixels, otherwise, appending the pixel value to the sequence of image pixels.

11. The method of claim 10 where one of the pre-selected fixed distances is one pixel.

12. The method of claim 10 where the pre-selected fixed distances are two in number.

13. The method of claim 10 where one of the pre-selected fixed distances is one plus a length of one scan line of the image.

14. The method of claim 10 where a length of the string of pixels is unbounded.

15. A computer-program product, encoded on a tangible machine-readable medium, operable to cause a digital processor to perform operations comprising:
    receiving the image as a sequence of pixels in raster order;
    first encoding the sequence of pixels into first tokens based on a set of compression parameters while gathering statistical information about the first tokens, where the set of compression parameters includes token encoding parameters;
    analyzing the statistical information to determine whether a recompression of the first tokens will reduce an encoding size; and
    when recompression of the first tokens will reduce encoding size, second encoding the first tokens into second tokens based on the statistical information such that a number of bits used to represent the second tokens is less than a number of bits used to represent the first tokens.

16. The computer-program product of claim 15 where the compression parameters are selected based on a type of data being compressed.

17. The computer-program product of claim 15 where the compression parameters specify a token format.

18. The computer-program product of claim 15 where the compression parameters correspond to a set of statistics about the frequencies of tokens encoded from other images similar to the image.

19. The computer-program product of claim 15 where the statistical information includes the frequency of a particular token in the first tokens.

20. The computer-program product of claim 15, further comprising:
selecting a set of compression parameters that will minimize the size of the second encoding.

21. The computer program product of claim 15 where the statistical information is a number of times each token type occurs in the first tokens.

22. The computer-program product of claim 15, further comprising:
analyzing the statistical information to determine the cost of performing the second encoding.

23. The computer-program product of claim 15 where first encoding includes:
for each pixel, determining whether the pixel is part of a first string of pixels that is identical to a second string of pixels found previously in the image at one of a plurality of pre-selected fixed distances from the first string of pixels, where one of the pre-selected fixed distances is a length of one scan line of the two-dimensional image;
if so, encoding the first string of pixels as a string token that is a reference to the second string of pixels; and
otherwise, encoding the pixel as a non-string token.

24. A computer-program product, encoded on a tangible machine-readable medium, operable to cause a digital processor to perform operations comprising:
receiving the compressed representation of the image as an ordered sequence of tokens;
decoding each token in the sequence of tokens to incrementally create a sequence of image pixels in raster order, where decoding each token includes:
determining whether the token refers to a pixel value or a string of pixels in the image pixels, the string being at one of a plurality of pre-selected fixed distances from a given pixel in the image pixels, where one of the pre-selected fixed distances is a length of one scan line of the image; and
appending the string of pixels to the sequence of image pixels if the token refers to a string of pixels, otherwise, appending the pixel value to the sequence of image pixels.

25. The computer-program product of claim 24 where one of the pre-selected fixed distances is one pixel.

26. The computer-program product of claim 24 where the pre-selected fixed distances are two in number.

27. The computer-program product of claim 24 where one of the pre-selected fixed distances is one plus a length of one scan line of the image.

28. The computer-program product of claim 24 where a length of the string of pixels is unbounded.

29. A computer program product, encoded on a tangible machine readable medium, operable to cause a digital processor to perform operations comprising compressing a two-dimensional image represented as a raster of pixels, each pixel having a value, the product further comprising:
receiving a sequence of the pixels in raster order;
defining a first match pixel location and a second match pixel location relative to a current pixel location in the raster, a first match pixel being the pixel at the first match pixel location relative to the current pixel, a second match pixel being the pixel at the second match pixel location relative to the current pixel, where the first pixel location and the second pixel location are not contiguous in the sequence;
considering each pixel in turn as the current pixel, performing the actions of:
comparing the current pixel only to the first match pixel and the second match pixel and then encoding the value of the current pixel if the value of the current pixel does not match the value of the first match pixel or the value of the second match; and otherwise
if the value of the current pixel matches the value of the first match pixel then encoding the current pixel as a first token where the first token includes a reference to the first match pixel and a length and where the length is determined based on a number of consecutive pixels relative to the current pixel whose values match the values of similarly located pixels relative to the first match pixel; or
if the value of the current pixel matches the value of the second match pixel then encoding the current pixel as a second token where the second token includes a reference to the second match pixel and a length and where the length is determined based on a number of consecutive pixels relative to the current pixel whose values match the values of similarly located pixels relative to the second match pixel.

30. A computer program product, encoded on a tangible machine readable medium, operable to cause a digital processor to perform operations comprising compressing a two-dimensional image, the two-dimensional image divided into a sequence of scan lines where each scan line includes a sequence of pixels and where each pixel has an associated value representative of a shade to be rendered when displaying the two-dimensional image on a raster output device, the product further comprising:
processing pixels in raster order including, for each pixel, comparing the value of the pixel with values of a plurality of previously processed pixels, and if a match is detected then encoding the pixel as a reference to a matching pixel and a length where the length is determined based on a number of consecutive pixels that satisfy a matching criterion where the matching criterion is defined by a relationship between the pixel and the matching pixel; and
if the value of the pixel does not match the value of any of the plurality of previously processed pixels then encoding the pixel value as a ranking based on a distance of its value from a value of a previous pixel.

31. A computer program product, encoded on a tangible machine readable medium, operable to cause a digital processor to perform operations comprising generating a compressed representation of a two-dimensional image where the image is described as a sequence of pixels in raster order, the product further comprising:
receiving the two-dimensional image as a sequence of pixels in raster order;
for each pixel, determining whether the pixel is part of a first string of pixels that is identical to a second string of pixels found previously in the image at one of a plurality of pre-selected fixed distances from the fist string of pixels;

if so, encoding the first string of pixels as a string token that is a reference to the second string of pixels;

otherwise, encoding the pixel as a non-string token having a ranking based on a distance of a value of the pixel value from a value of a previous pixel.

32. A computer program product, encoded on a tangible machine readable medium, operable to cause a digital processor to perform operations comprising generating an uncompressed representation of a two-dimensional image as a sequence of pixels in raster order, given a compressed representation of the image as a sequence of encoded tokens, each token representing either a first string of pixels that is identical to a second string of pixels that occurs previously in the uncompressed representation of the image or a single encoded pixel value, the single encoded pixel value being encoded as a ranking based on a distance of its value from a value of a previous pixel, the product further comprising:

sequentially retrieving the encoded tokens;

decoding each encoded token; and if a token represents a first string of pixels, outputting the first string by copying a second string of pixels specified by the token;

otherwise, outputting a pixel having a value specified by the token.

* * * * *